United States Patent [19]

Shank

[11] Patent Number: 5,068,996
[45] Date of Patent: Dec. 3, 1991

[54] SELF-STORING FISHING ROD HOLDER

[76] Inventor: Walter A. Shank, 4918 Southland Dr., Sarasota, Fla. 34231

[21] Appl. No.: 503,473

[22] Filed: Mar. 28, 1990

[51] Int. Cl.⁵ ............................................ A01R 97/10
[52] U.S. Cl. ...................................... 43/21.2; 248/538
[58] Field of Search ................. 43/21.2; 248/514, 538, 248/534

[56] References Cited

U.S. PATENT DOCUMENTS

| 3,802,112 | 4/1974 | Banner | 43/21.2 |
| 3,906,653 | 9/1975 | Williams | 43/21.2 |
| 4,586,688 | 5/1986 | Hartman | 43/21.2 |
| 4,897,952 | 2/1990 | Hawie | 43/21.2 |
| 4,932,152 | 6/1990 | Barlotta et al. | 43/21.2 |

Primary Examiner—Kurt Rowan
Assistant Examiner—J. Miner

[57] ABSTRACT

A fishing rod holder is disclosed, the primary members of which are a wedge shaped base and a holding tube including a flange. When utilizing two rod holders, one wedge shaped base can be inverted. This allows two rod holders to be used on one side of a boat without the lines interfering with each other. An arcuate slot is provided on the wedge shaped base which allows the rod holder to assume the same positions whether mounted with the wedge shape angled up or down.

7 Claims, 4 Drawing Sheets

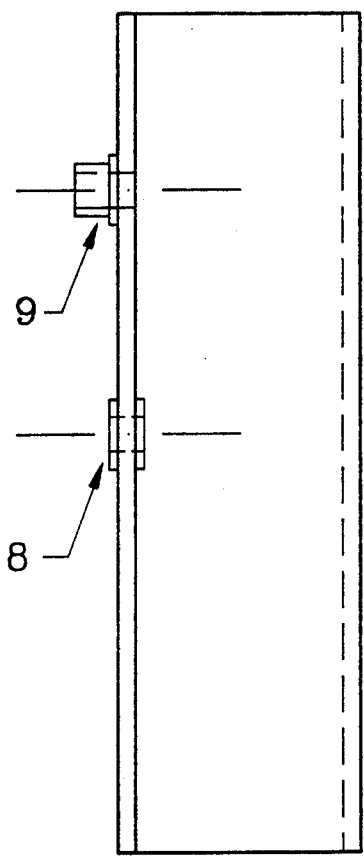
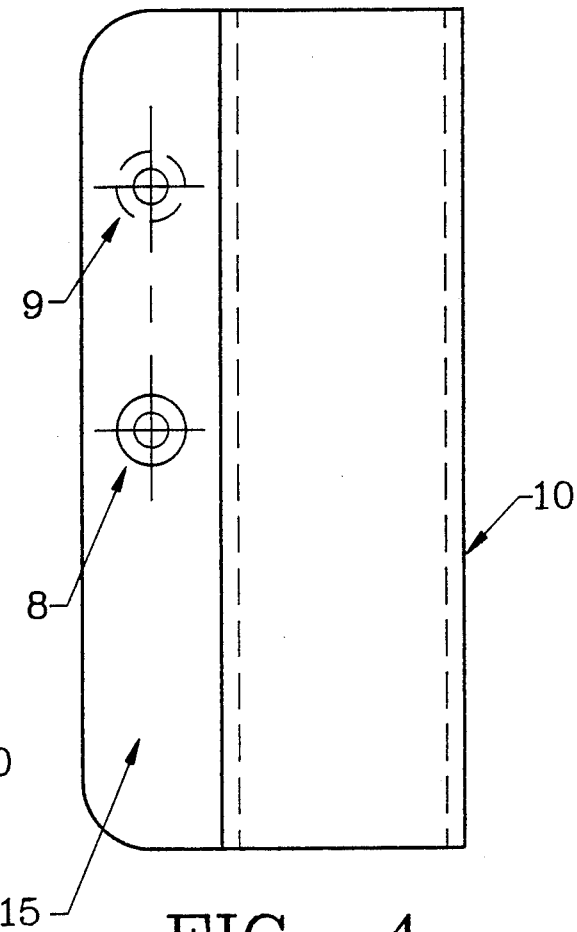
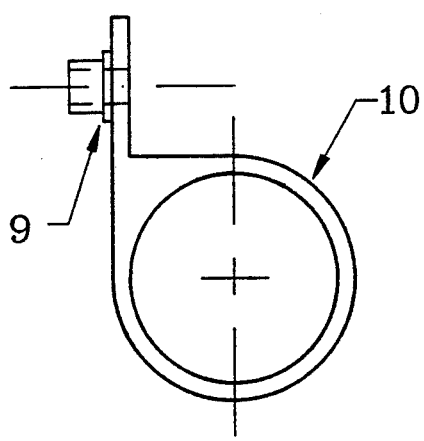
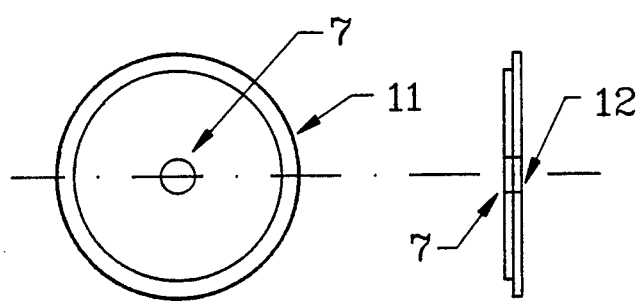
FIG. 3   FIG. 4   FIG. 5   FIG 6   FIG. 7

SELF-STORING FISHING ROD HOLDER

DESCRIPTION

The self storing fishing rod holder is unique from all others in its simplicity in design and dedication to function.

The rod holder is comprised of one stationary part and one moveable part. The stationary parts consist of: a wedge shaped baseplate, FIG. 1 and FIG. 2, with a wide edge and a thin edge; and a washer FIG. 6 and FIG. 7. The moveable part consists of a rod holder, FIG. 5.

When mounted to the starboard or port side of a boat the rod holder provides two functions. FIG. 10 indicates the rod holder (10), mounted on the baseplate (1) and in the fishing position, as well as the rod holder (10) horizontally in the storing position. The rod holder (10) includes a flange portion (15).

The baseplate (1) may be mounted dually on either the starboard or port sides of the boat in a position juxtaposed with one another in that the wide end of the baseplate (1) is inverted, or opposed to one another. Thus, two rods may be in the fishing position simultaneously, yet will not interfere with each other preventing a tangling of a fishing line. Both rods may be in the storing position simultaneously.

While in the fishing position the rod holder (10) becomes "stationary", whereas the rod holder (10), being in the direction of the stern of the boat, and subject to the natural forces involved with the movement of the current, or forward motion of the boat. The rod holder (10) moves along the arc of the slot (5), an integral part of the base plate (1), reaches the limits of the slot (5), and becomes subject to said forces.

The slot (5) and stop (9) are design related in such a way as to allow the rod holder (10) to assume a particular angle while in the fishing position. While the fishing rod handle is in the rod holder (10), the combination of the downward pull on the tip of the rod due to current or forward motion of the boat and the particular angle assumed by the rod holder (10), the rod handle becomes fixed in the rod holder (10), by means of a physical forces of friction and leverage, therefore preventing the fishing rod from being pulled from the rod holder (10).

Objects mentioned in the description of the invention will be apparent from the following specifications and drawings of which:

FIG. 3 is a side view of the rod holder (10)

FIG. 4 is a tip view of the rod holder (10)

FIG. 5 is an end view of the rod holder (10)

FIG. 6 is a face view of the washer (11)

FIG. 7 is a side view of the washer (11)

FIG. 1 shows a baseplate (1) with four mounting holes (4) for securing the object to a support. The plate has an arcuate cutout slot (5), a pivot hole (2) to receive a bolt for pivotally mounting the rod holder (10), and a circular raised surface (3) around the pivot hole (2) acting a spacer.

FIG. 2 shows a section through the center of the baseplate (1), highlighting its angular shape, with mounting holes (4) arcuate cutout slot (5), backside face (6) of baseplate (1), pivot hole (2) and circular raised surface (3) around pivot hold (2).

FIG. 3 shows side view of rod holder (10), circular raised spaces around pivot hold (8), and stop (9) through which passes a hole for securing a washer (11) on the back side of the baseplate (1) with corrosion resistant nut and bolt.

FIG. 4 shows the top view of rod holder (10), circular raised spacer around pivot hole (8) and stop (9) through which passes a securement hole.

FIG. 5 shows an end view of the rod holder, highlighting its cylindrical shape, with stop (90 through which passes a securement hole.

FIG. 6 shows a face view of the washer (11) with a hole through which passes a bolt which passes also through the hole in the stop (9).

FIG. 7 shows a side view of the washer (11) and hole (7).

FIG. 8 shows a view of the Self Storing Rod Holder in fishing position as well as in storing position, the fishing rod being inserted into the rod holder (10) which is mounted pivotally on the baseplate.

FIG. 9 shows an isometric exploded view of the base plate (1), rod holder (10), washer (11), corrosion resistant nuts and bolts, and their relationship.

Figure 1:
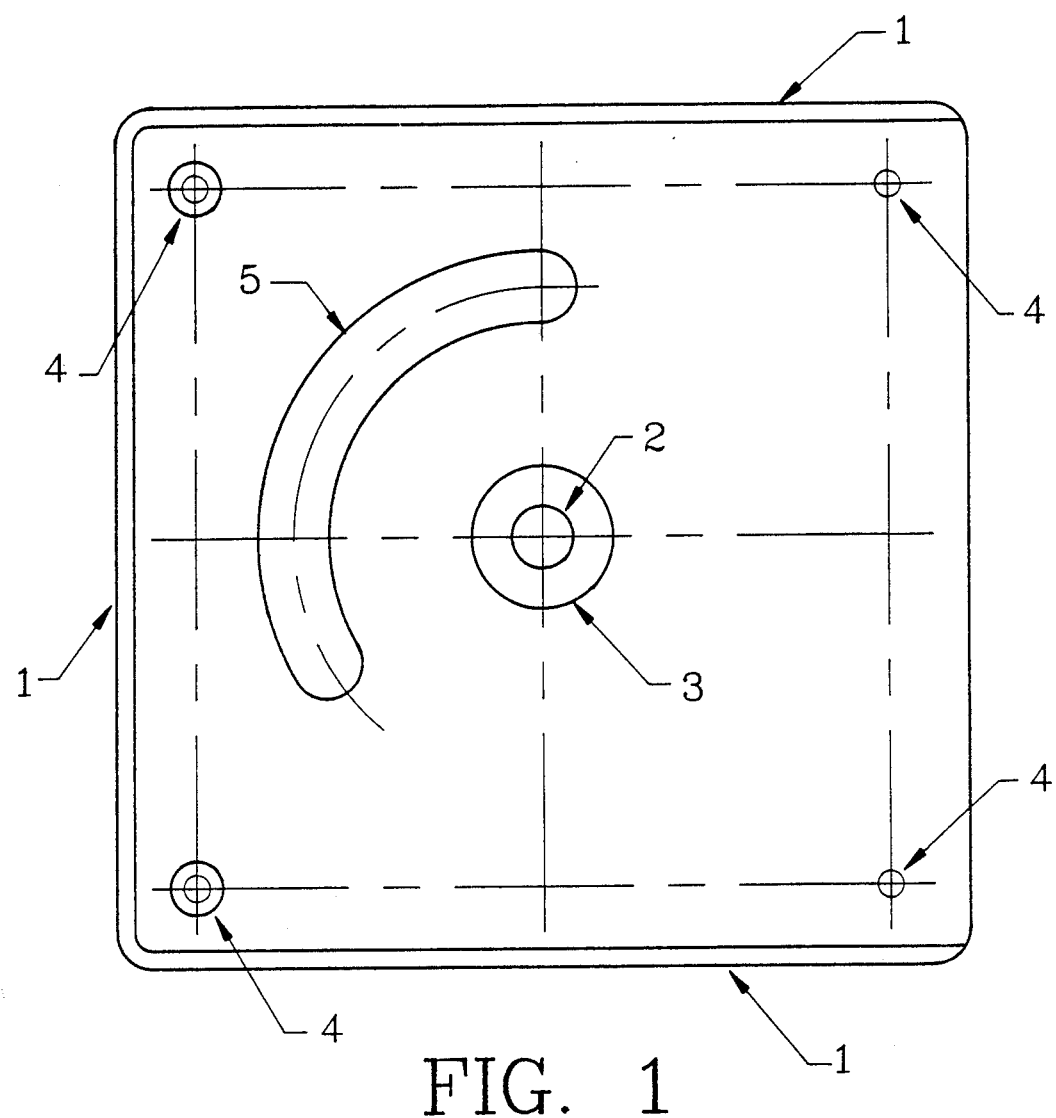
FIG. 1 is a view of the back side of the baseplate (1)
Figure 2:
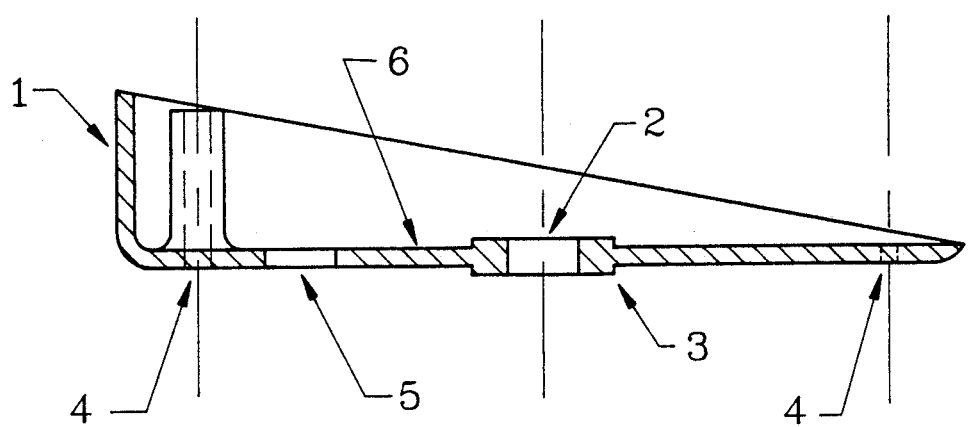
FIG. 2 is a view of a section through the center of the baseplate (1)
Figure 8:
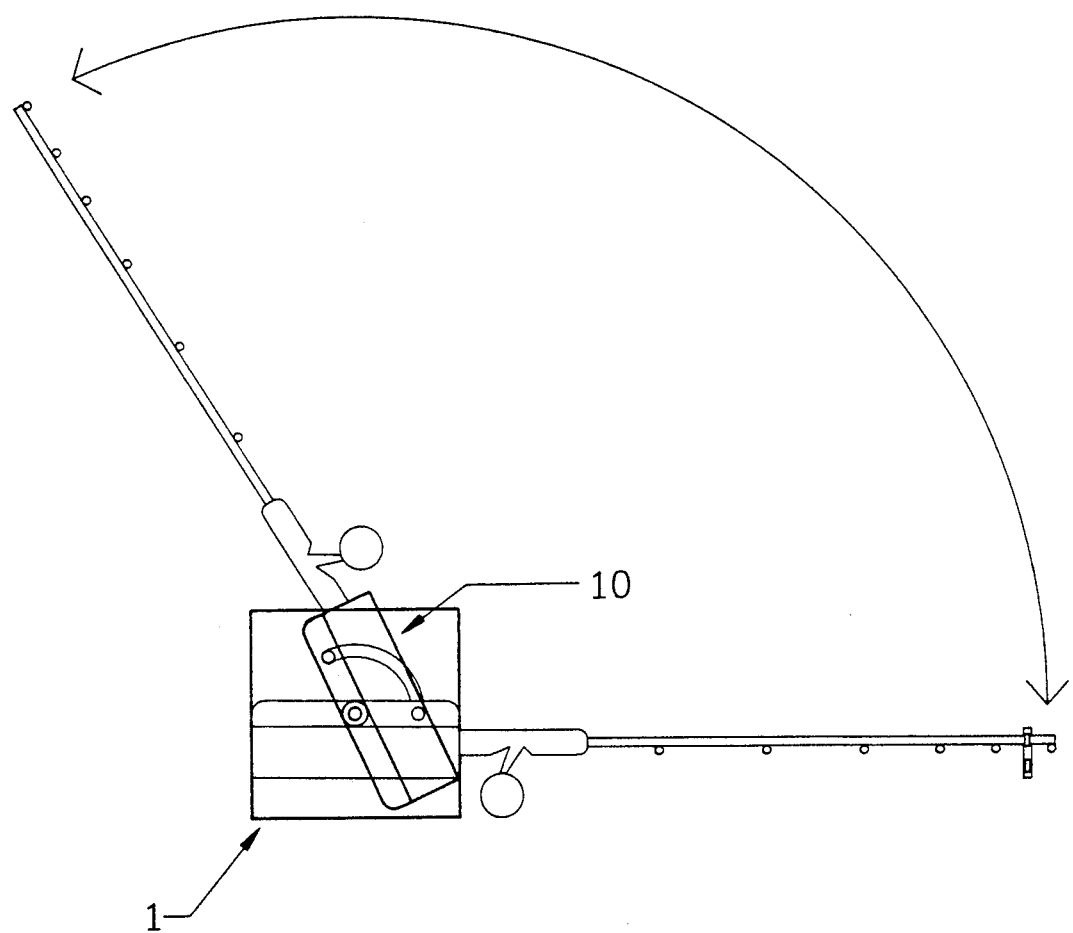
FIG. 8 shows the Self Storing Rod Holder in the fishing position as well as the storing position
Figure 9:
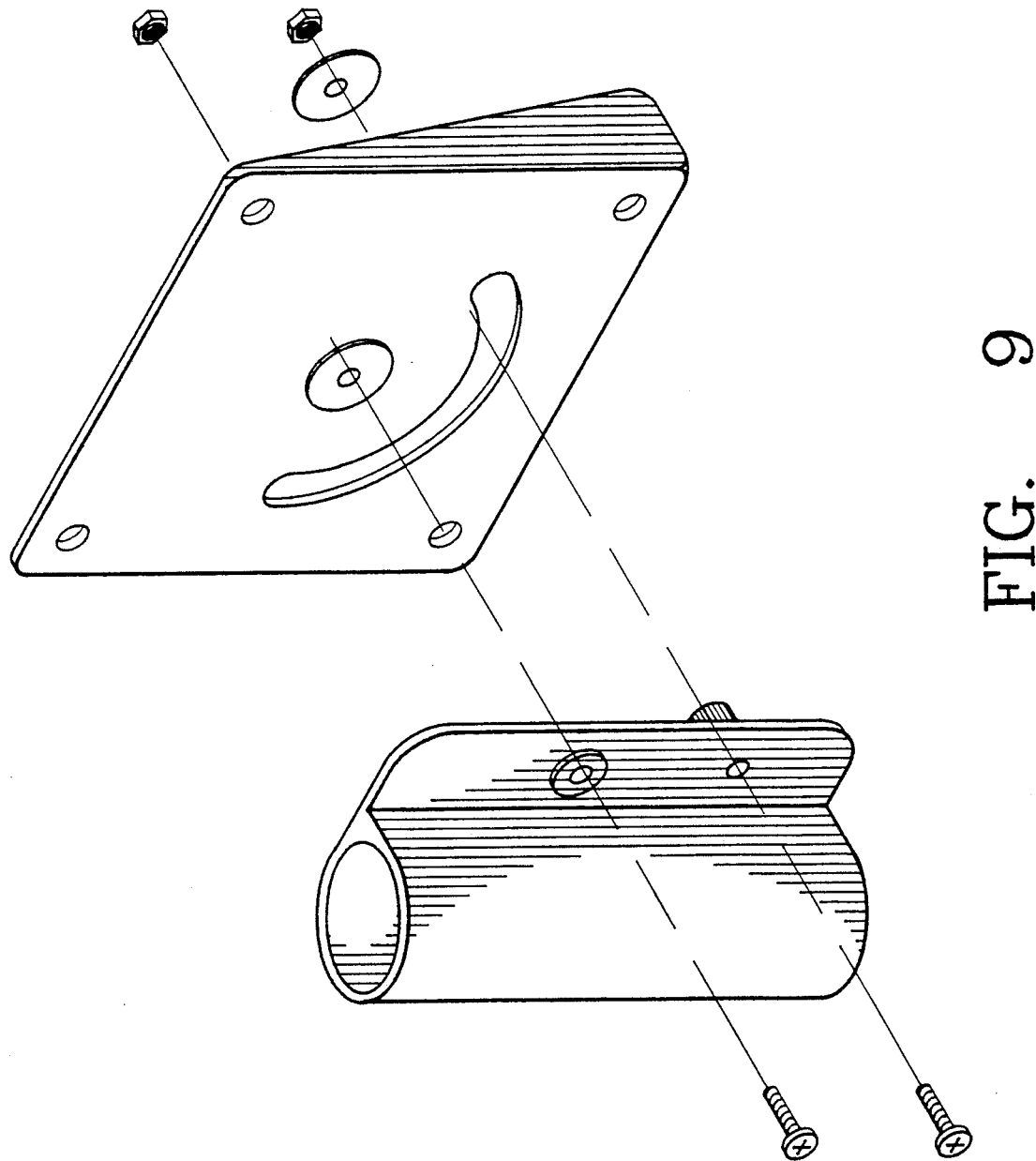
FIG. 9 is an isometric exploded view of the baseplate (1), rod holder (10), washer (11), and corrosion resistant nuts and bolts.

I claim:

1. A multi-directional fishing rod holder comprising:
   a wedge shaped baseplate with means for mounting the plate to a support, said baseplate comprising an arcuate slot of predetermined length extending equidistantly around a pivot point centered in said baseplate,
   a holding tube for a fishing rod, a flange integrally formed with said holding tube and extending tangentially from an outer surface thereof, and a stopping portion integrally formed on the surface of said flange,
   a first threaded bolt extending through the center of said flange and serving to connect said flange to said pivot point, said stopping portion being positioned in said arcuate slot and serving to limit the pivotal movement of said holding tube, and
   a second threaded bolt extending through said stopping portion and serving to secure a retaining washer.

2. Apparatus as in claim 1, wherein the invention is constructed entirely of rigid plastic and fasteners which are virtually non reactive to corrosive elements.

3. Apparatus as in claim 1, wherein said arcuate slot allows the rod to rotate within 30 to 125 degrees of a first position.

4. Apparatus as in claim 1, wherein the predetermined length of the slot allows the rod holder to assume the same angle in a use position or in a storage position whether mounted with the wedge shape angled up or down.

5. Apparatus as in claim 1, wherein the wedge shape of the baseplate allows for the mounting of two fishing rod holders on either port or starboard sides, simultaneously, the wide end of the baseplates being opposed to one another thereby directing two fishing rods away from one another and inhibiting fishing line interference.

6. Apparatus as in claim 1, wherein the fishing rod holder can store a fishing rod in a horizontal position without removing it from the holder.

7. Apparatus as in claim 1, wherein the fishing rod may be held in the holding tube by natural physical forces due to current or forward motion of the boat acting downward on the fishing rod tip and by function and leverage on the rod handle in the holding tube, the holding tube being at a particular angle as determined by the length of the slot, thereby eliminating the need for rod locking or retaining devices.

* * * * *